Dec. 22, 1936.  R. W. GATES  2,065,447

EGG CASE FILLER

Filed June 5, 1936

Renfrew W. Gates
INVENTOR

BY Victor J. Evans & Co.
ATTORNEYS

Patented Dec. 22, 1936

2,065,447

UNITED STATES PATENT OFFICE 2,065,447

EGG CASE FILLER

Renfrew W. Gates, Gainesville, Fla.

Application June 5, 1936, Serial No. 83,805

REISSUED

2 Claims. (Cl. 217—26.5)

The invention relates to egg supports and more especially to egg case fillers or flats.

The primary object of the invention is the provision of a filler of this character, wherein a determined number of eggs can be conveniently nested and at the same time affording flats for supporting within an egg case or the like such eggs so that these will be suspended on their vertical axes in shock-proof spaces or areas insuring against breakage either from pressure or jarring and allowing circulation of air or ventilation throughout the nested eggs to have the same fresh during shipment with resultant sanitation.

Another object of the invention is the provision of a filler of this character wherein the spaces or areas for the eggs are created in a novel manner and are constituted from pulp material molded and shaped to afford a combined flat and filler for egg cases or the like.

A further object of the invention is the provision of a filler of this character wherein eggs when nested therein will be protected against breakage in that the respective eggs are cushioned and the same can be packed without regard to the sizes thereof, the cushions accommodating any ordinary irregularity in the eggs, the filler being of novel construction to assure safety in the transportation of the eggs when within a case, carton or the like, both to the shells and the delicate interior contents.

A still further object of the invention is the provision of a filler of this character, which is simple in its construction, thoroughly reliable and efficient in its operation, preventing displacement of the eggs when nested, particularly during shipment thereof, strong, durable, and practical to manufacture.

With these and other objects in view, the invention consists in the features of construction, combination and arrangement of parts as will be hereinafter more fully described, illustrated in the accompanying drawing, which discloses the preferred embodiment of the invention and pointed out in the claims hereunto appended.

In the accompanying drawing.

Similar reference characters indicate corresponding parts throughout the several views in the drawing.

Figure 1:
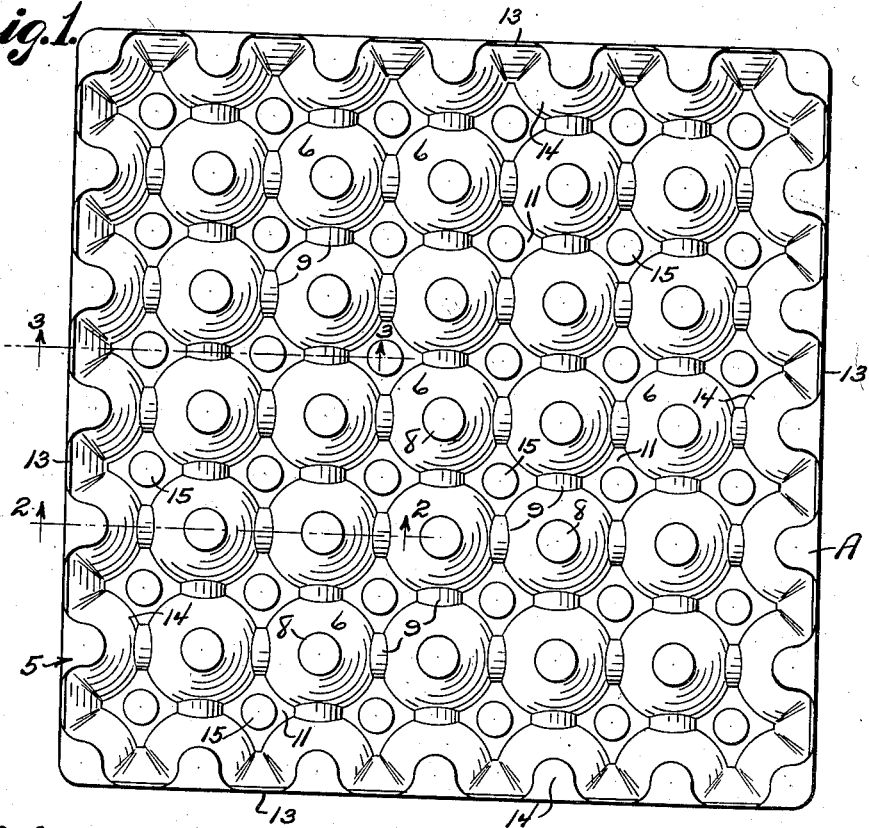
Figure 1 is a top plan view of a filler constructed in accordance with the invention.
Figure 2:
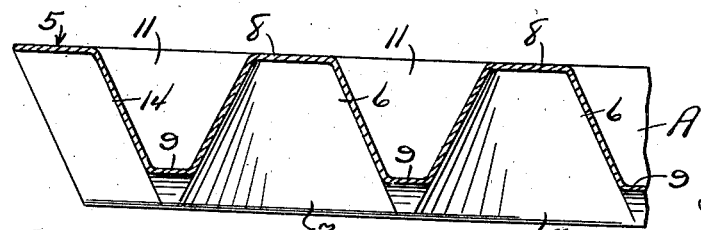
Figure 2 is an enlarged fragmentary vertical sectional view taken on the line 2—2 of Figure 1 looking in the direction of the arrows.
Figure 3:
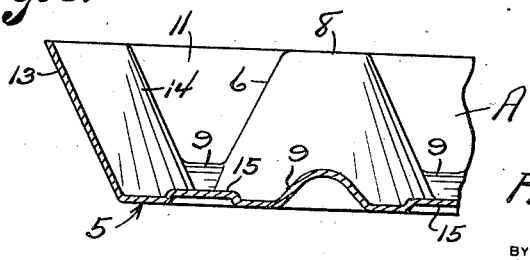
Figure 3 is a view similar to Figure 2 taken on the line 3—3 of Figure 1 looking in the direction of the arrows.
Figure 4:
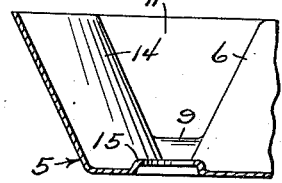
Figure 4 is a view similar to Figure 3 showing a slight modification.

Referring to the drawing in detail, the filler is identified generally at A and comprises a body 5 made from wood pulp in molded form having the required density for strength and durability. This body 5 has molded therein rows of closely arranged truncated hollow cones 6, the rows being arranged transversely and longitudinally of the said body 5 while the cones 6 open through this body at the larger end 7 thereof while at the other or smaller ends of the cones of the truncated areas thereof they are closed at 8, respectively. In Figure 3 of the drawing the contacts 15 are closed while in Figure 4 of the said drawing each contact 15 is open.

Between the cones 6 are upwardly arched fillets 9, these merging into the rounded walls of the respective cones. The spaces or areas 11 between the cones 6, respectively, are for accommodation of eggs.

It is, of course, understood that in the nesting of eggs the latter are placed within the spaces or areas 11 to have the same suspended on their vertical axes and another filler inverted and superimposed upon the first, these eggs being thus nested will have contact at both ends with the rounded walls of the cones so that said eggs in said positions will be cushioned against shocks and jars insuring against breakage either from pressure or jarring. The filler constructed as before described affords a combination filler and flat, two of which are required for each layer of eggs, the material or pulp from which the same is molded is sterilized so that it will be strictly sanitary and odorless.

This body 5 marginally of and at the four edges of the same has the fluted border or fence 13, it having semicone formations at 14 corresponding to the cones 6 thus with the said cones 6 next thereto will hold eggs adjacent to said border or fence and protect such eggs against shocks and jars when carried by the filler.

The cones 6 in their arrangement and in conjunction with the border or fence 13 will assure ventilation to the nested eggs and at the same time insuring against breakage through shocks and jars incident in the shipment of the eggs in cases, cartons or the like.

Intermediate of the fillets 9 and centrally between the cones 6 are upstruck circular contacts 15 for cushioning the eggs as contained within the spaces or areas 11. These contacts 15 or cushions can be used with closed tops yet preferably the tops are opened and thus form vents for ventilating purposes. Additionally the opened tops allow for candling a filler full of eggs at one time by placing the filler over a brightly illuminated area thus lighting up all the eggs at once. These cushions or contacts 15 augment the cushioning of the eggs against and between the cones.

When the fillers are not in use, the same can be nested one within the other or interfitted in each other, this being accomplished by superimposing one filler onto the other.

What is claimed is:

1. A filler of the character described comprising a fibrous sheet-like body, truncated hollow cones struck from said body and arranged in rows having definite spacing therebetween and forming reversely opened areas, open-top cushions struck from said body between the cones, and bearings struck from said body to be disposed medially of certain of said spaces or areas.

2. A filler of the character described comprising a fibrous sheet-like body, truncated hollow cones struck from said body and arranged in rows, fillet-like projections struck from said sheet-like body and joined with the hollow cones at the bases thereof for effecting definite spacing therebetween and providing reversely opened areas, cushions struck from said body between the cones and substantially V-shaped panels struck from said body between the outer cones of the aggregate and constituting with said outer cones a border around the entire aggregation of cones.

RENFREW W. GATES.